April 24, 1934. I. L. BRAMWELL 1,956,459
APPARATUS FOR SEPARATION OF DRY MATERIALS
Filed April 10, 1931 6 Sheets-Sheet 1

April 24, 1934.  I. L. BRAMWELL  1,956,459
APPARATUS FOR SEPARATION OF DRY MATERIALS
Filed April 10, 1931    6 Sheets-Sheet 4

I. L. Bramwell
INVENTOR

By: Marks & Clerk
ATT*ys*

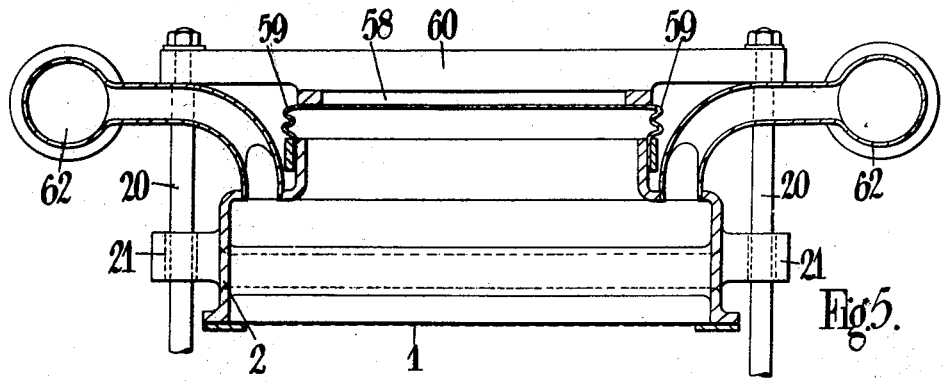
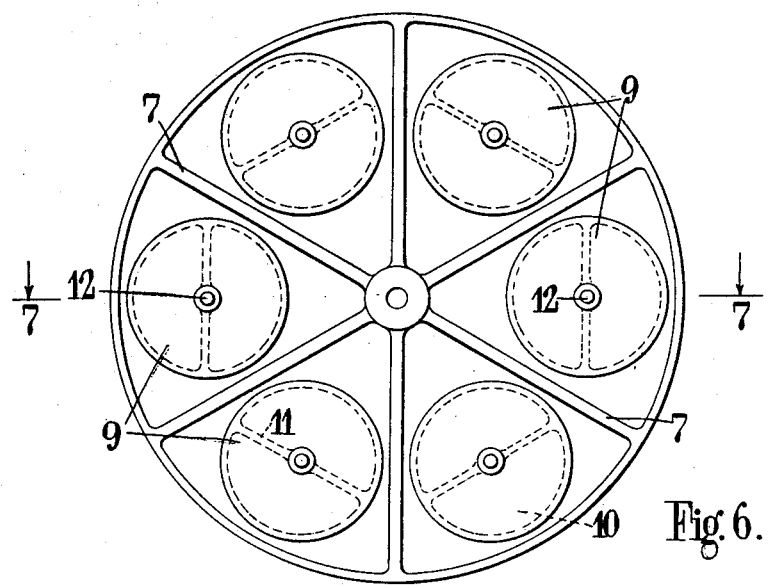
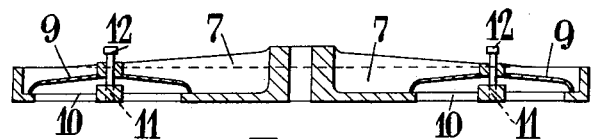

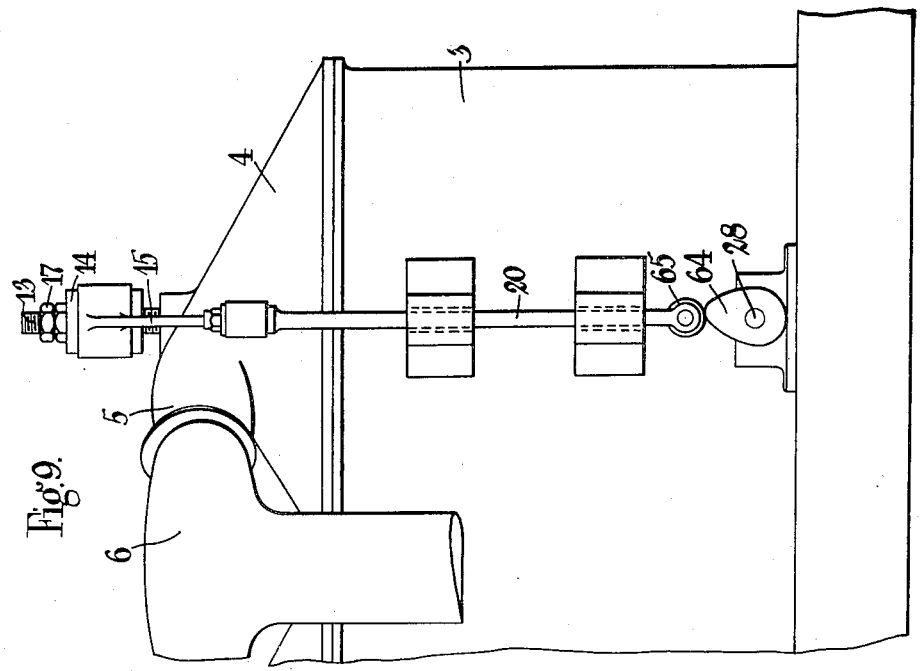
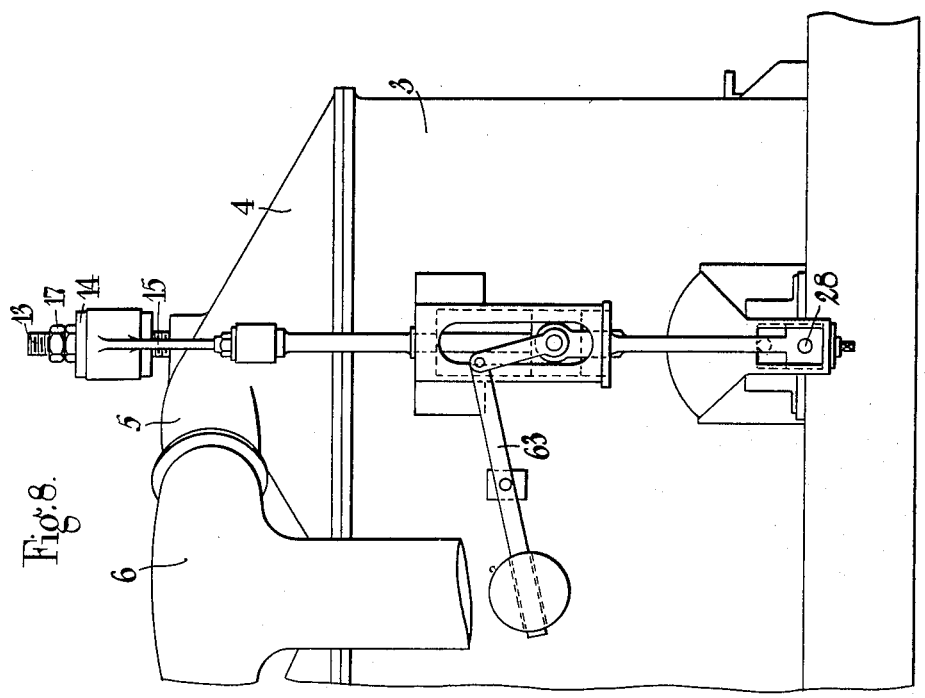

Patented Apr. 24, 1934

1,956,459

UNITED STATES PATENT OFFICE 1,956,459

APPARATUS FOR SEPARATION OF DRY MATERIALS

Ivor Lloyd Bramwell, Birtley, England, assignor of one-half to The Birtley Company Limited, Birtley, England Application April 10, 1931, Serial No. 529,235
In Great Britain April 11, 1930

2 Claims. (Cl. 209—476)

This invention relates to the separation of dry materials. It is particularly directed to the separation of slate or other impurities or refuse from coal, that is to the dry cleaning of coal, but it is not limited thereto and includes the cleaning and grading of agricultural and mineral products and the like generally.

The invention more specifically relates to apparatus for maintaining a fluid condition in the bed of intermixed divided materials by means of pulsating pressures of air or the like.

In certain previous forms of pneumatic separators pulsating pressures of air have been employed beneath the bed of material to stratify and various means have been adopted to attain this end.

Simple pistons or bellows have been employed, but with little success, as the stratification obtained on the pressure stroke was destroyed wholly or in part by the return or suction stroke.

Subsequently, valves operated either mechanically or by variations in the air pressure beneath the bed were employed, their object being to admit air at atmospheric pressure into the bellows or chamber above the piston, thereby diminishing the harmful effect of the suction stroke upon the separation. Such means have not proved entirely successful because of the difficulty of synchronizing the valve action with the extremely rapid variations of air pressure beneath the bed in the case of mechanically operated valves, whilst the multiplicity of parts moving at high speed rendered such apparatus unsuitable for continuous commercial operation.

Also in the case of simpler apparatus where the valves were operated by variations in the air pressure beneath the bed it has been found impossible to overcome the lag in operation and therefore the harmful effect of the suction stroke upon the desired separation has only been partially eliminated.

Other types of apparatus have employed a comparatively large rotary or semi-rotary valve interposed between a fan or blower providing a continuous air pressure in the bed of material to be treated.

In such prior apparatus it has not been possible to avoid employing a chamber of comparatively large volume between the valve and the bed of material to be stratified and this, coupled with the fact that the valves employed have had comparatively short periods in the full open and shut positions compared with the time interval at intermediate positions, has greatly diminished the magnitude of the desired pulsations.

An attempt has also been made in prior apparatus to employ the principle of resonance by synchronizing the periodicity of the pulsations with the length of the air chamber between the valve and the bed of material to be treated.

In such apparatus very small changes in the speed of the rotation or oscillation of the valve destroy the advantages gained from the improved pulsations. Even such small factors as normal variations in the voltage of the electric current operating the valve are sufficient to impair the desired results, and further, when this form of apparatus is employed in conjunction with a reciprocating table, it becomes also necessary to synchronize the means employed for obtaining resonance with the speed of oscillation of the table. In practice this is substantially impossible.

The object of the present invention is to provide improved or modified arrangements for maintaining a pulsating air pressure beneath the pervious surface of the pneumatic separator supporting the mass of divided material to be stratified, free from the disadvantages referred to above.

The invention consists in the provision of a pervious surface upon which the material to be stratified is supported and in the provision of means above the bed of material such as a piston or the like, whereby pulsations of negative pressure may be formed above the bed, for instance, by a continuous suction or negative pressure maintained above the bed of materials in combination with a piston or the like for superimposing pulsations upon such negative pressure.

The invention further consists in means whereby the action of the suction is uniformly distributed over the bed of materials, for instance by means of a plurality of pipes or the like, or in another form by means of a plurality of openings in the underside of a hollow piston, which are connected to the source or suction of negative pressure.

The invention also consists in an arrangement according to either of the preceding two paragraphs provided with means whereby the volume of air exhausted through the bed may be controlled.

The invention further consists in an air chamber extending substantially above the whole of the bed bounded by walls whose height is relatively small compared with its dimension in a horizontal plane and from which air under suction may be exhausted substantially as described above, and having on its upper side a piston or the like capable of being reciprocated in a substantially vertical direction.

The invention further consists in means according to any of the preceding four paragraphs whereby the pulsations, as caused for example by the speed of reciprocation of the piston or the like may be varied as may be found desirable.

The invention further consists in means according to any of the preceding five paragraphs whereby the vertical height through which the piston or the like travels may be varied.

The invention further consists in means according to any of the preceding six paragraphs whereby the distance between the mean point of the vertical travel of the piston or the like and the upper surface of the bed of materials to be treated may be varied.

The invention further consists in apparatus for stratification of a bed of intermixed divided materials wherein the air within the bed is expanded and caused to assist in the stratification substantially as herein described.

The invention also consists in improvements in mechanism for separation of dry materials substantially as herein described.

Referring to the accompanying diagrammatic drawings:—

Figure 5 is a cross section on the line 5—5 of Figure 4 looking in the direction of the arrows.

Figure 6 is a plan of one form of piston with valves.

Figure 7 is a cross section on the line 7—7 of Figure 6 looking in the direction of the arrows.

Fig. 8 is an elevation showing means whereby reciprocating parts may be balanced by a pendulum, and, Fig. 9 is an elevation showing how a differential movement may be obtained by the cam arrangement.

Figure 1:
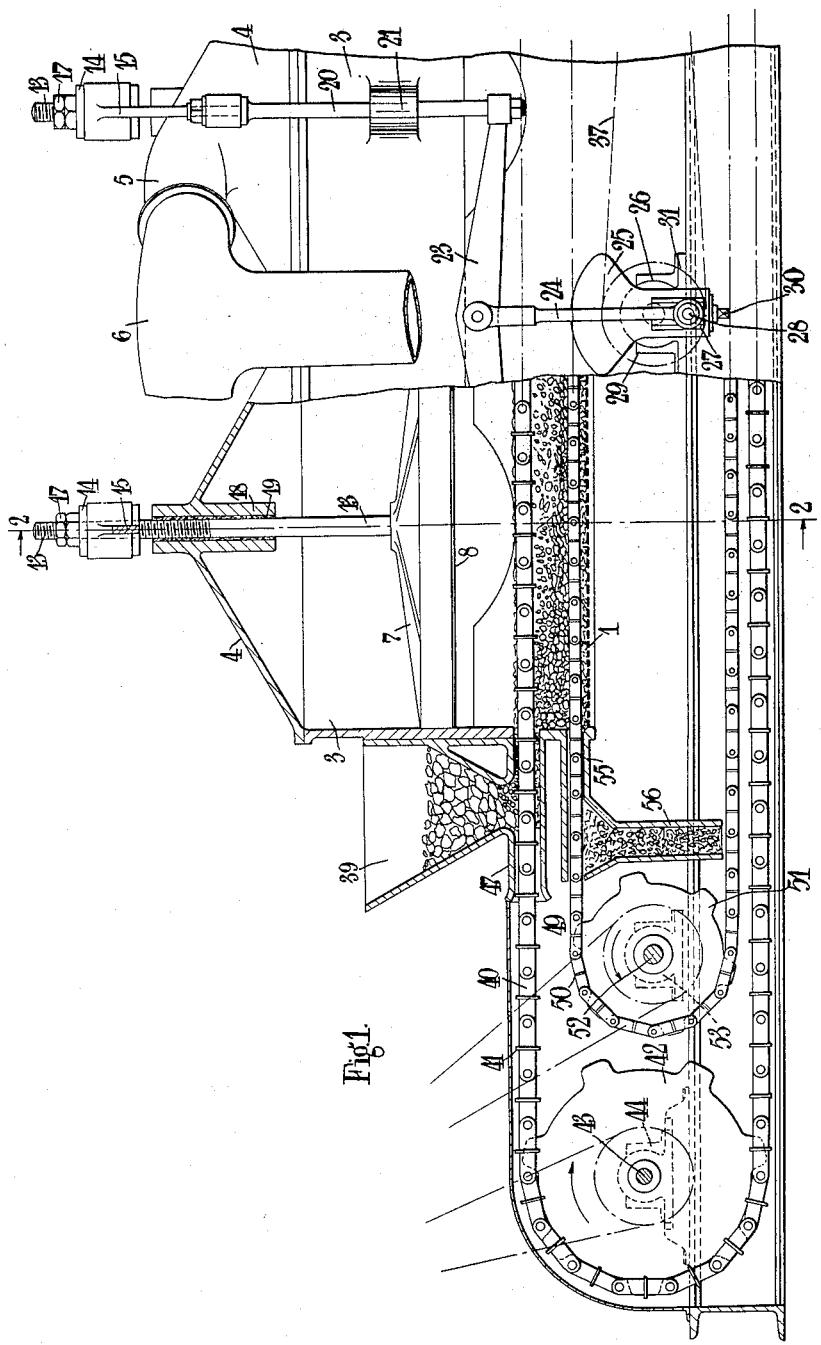
Figure 1 shows in part sectional side elevation part of a construction according to one form of the present invention, the remainder to the right of the drawing principally comprising pulleys and bearings.
Figure 2:
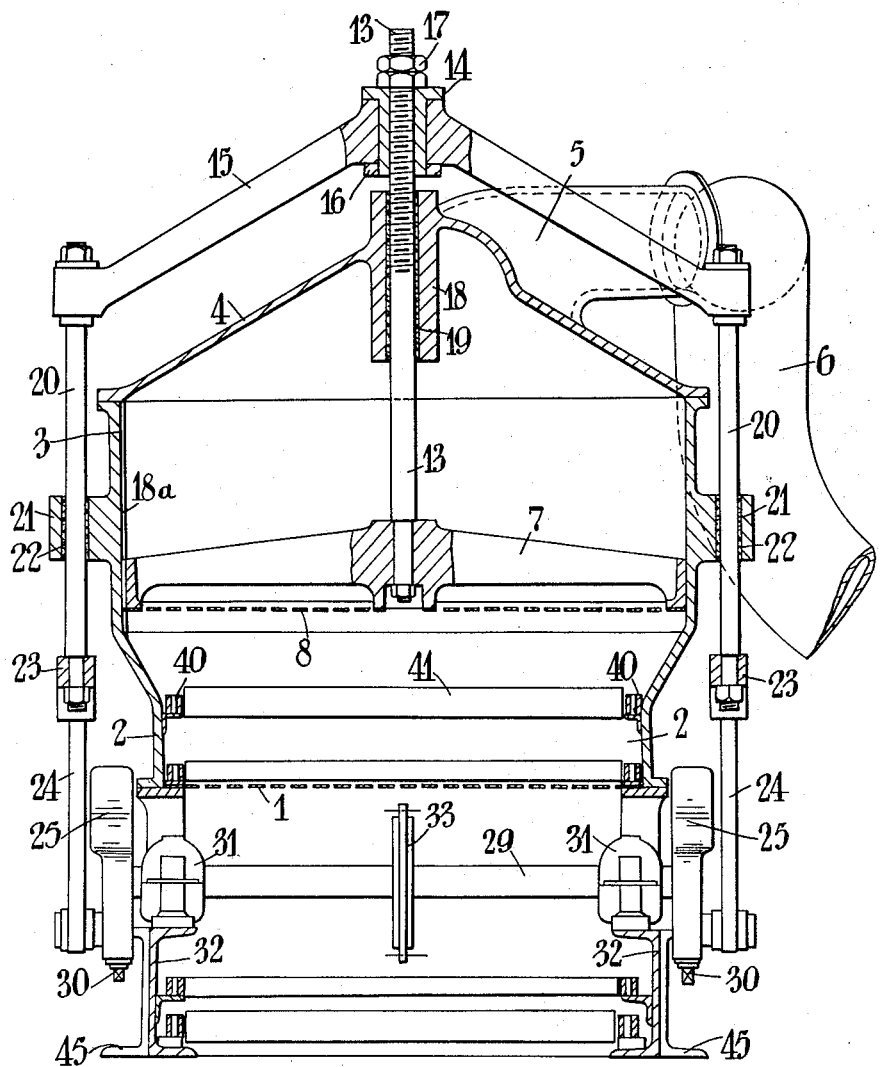
Figure 2 is a cross section on the line 2—2 of Figure 1 looking in the direction of the arrows.
Figure 3:
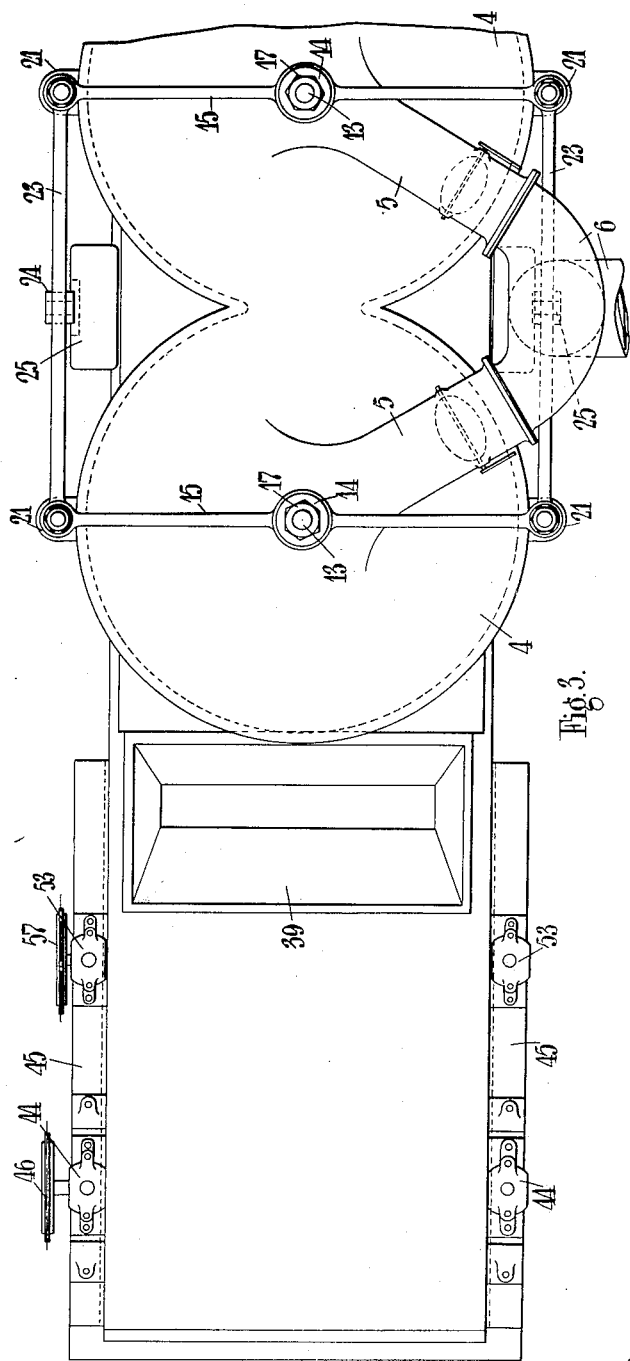
Figure 3 is a plan of Figure 1.

In carrying the invention into effect in the form illustrated by way of example in the drawings, referring more particularly to Figures 1 to 3, 6 and 7, material to be treated is supported upon an air pervious surface 1 fixed to side plates 2, thus forming a trough. The side plates 2 extend upwardly, and are shaped to form a cylinder or cylinders 3. These cylinders 3 are enclosed at their upper ends by means of covers 4 having outlet branches 5 which are connected to an air pipe 6. By connecting this pipe 6 to a fan or other suitable form of blowing apparatus, a constant negative air pressure is maintained in the trough and cylinders. Each cylinder 3 is provided with a piston 7 (Figures 6 and 7) which may be of the resistance type, having for instance a perforated plate 8, or may be provided with valves 9 which cover openings 10. The openings 10 may have bridging pieces 11 in which are fixed pins 12 which allow the valves 9 to move freely in a vertical direction. This arrangement acts automatically under the strokes of the piston, the air pressure, and the inertia of the valves. The piston is carried on a piston rod 13 which is screwed at its upper end. A sleeve nut 14 is carried by cross beam 15, the sleeve nut having a collar 16 on its underside, and is screwed to engage with the piston rod 13. Adjustment of the height of the piston 7 relative to the bed of material may be accomplished by rotation of the sleeve nut 14 which can be locked by a check nut 17. The piston 7 may be prevented from turning by means of a feather 18$^a$ on the wall of the cylinder 3, engaging with a slot, or groove, in the side of the piston 7. A guide 18, fitted with a bush 19 is provided in the cover 4 to ensure the piston rod 13 moving in a vertical direction. The cross beam 15 is attached to vertical rods 20, which are guided in bosses 21, fixed to the sides of cylinders 3, a bush 22 being provided to eliminate friction. The lower ends of rods 20 are attached to cross head beams 23 which are reciprocated in a vertical direction by connecting rods 24, these rods being actuated by a balanced crank 25. In order to vary the stroke of the piston, the crank 25 is provided with grooves 26 in which is mounted a slide block 27, carrying a crank pin 28, the relative distance between the centre of the crank pin 28 and the centre of the driving shaft 29 being adjusted by means of a screw 30. The driving shaft 29 is carried in bearings 31, which are mounted on the main frame 32 of the machine, and has a sprocket 33 mounted on its centre. Motion may be transmitted to the driving shaft 29 through a chain 37, for instance, by way of a counter-shaft having a sprocket mounted thereon receiving motion from any suitable source of power. By a suitable combination of the speed, length of stroke, and distance of the piston from the bed of material, any form of impulse may be impressed on the constant negative pressure.

In operation the material to be separated is fed into a hopper 39 and is conveyed into the aforementioned trough by means of a conveyor formed of links 40 and cross bars 41. The conveyor chain may be carried on sprockets mounted on shafts which are carried in bearings 44, the bearings being rigidly connected to end frames 45. The aforesaid shaft may have a sprocket 46 mounted at its outer end, by means of which the conveyor may be driven from any suitable variable speed gear.

The upper strand of the conveyor enters the trough through a port 47, which is of sufficient length to form a seal thus preventing the passing of air into the trough. This strand may leave the trough through a similar port the bottom of which is extended outwardly and downwardly to form a chute for the discharged material.

The upper strand of a second conveyor is placed in contact with, or near to, the aforementioned air pervious surface 1, which strand conveys the heavier material, separated out during stratification under the action of the air impulses, in a direction opposite to the aforementioned conveyor.

This conveyor is formed of links 49 and cross bars 50. The links 49 may be carried on sprockets mounted on shafts running in bearings 53 which are fixed on the end frames 45. At the points of entry and exit of this conveyor to the trough seal ports such as 55 may be provided, the exit port 55 being provided with a chute 56 for the discharge of the heavier product. The conveyor shaft referred to above may have at its outer end a sprocket 57, and may be driven by any suitable variable speed gear.

Figure 4:
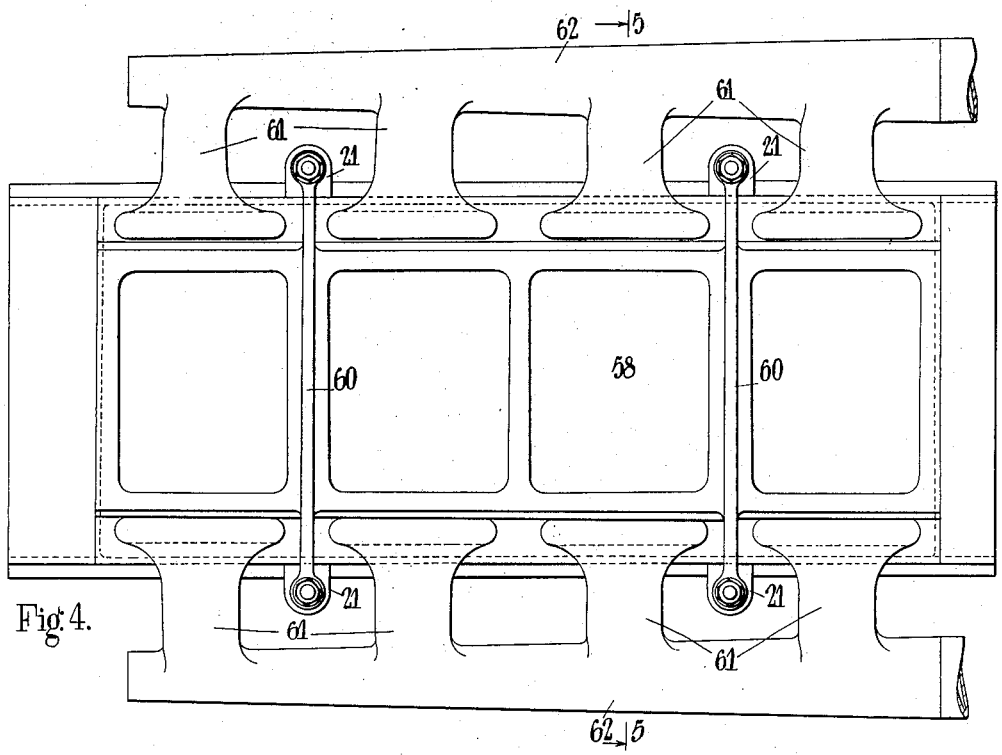
Figure 4 is a plan view of a modification.

According to the modification shown in Figures 4 and 5 the sides 2 of the trough are turned inwardly then upwardly. A flat rectangular piston 58 is connected to the top of sides 2 by flexible connections 59, and is operated by a cross beam 60. Constant negative air pressure is maintained above the bed of materials by a number of pipes 61, which are attached to air ducts 62. These ducts are connected to a fan or other suitable blowing apparatus. The piston may be operated by mechanism similar to the aforementioned apparatus or other suitable means. Conveyors may also be similarly applied for feeding and discharging the material to and from the apparatus.

In general applying the invention to the separation of shale or refuse from coal, the material is fed on to an air pervious support either stationary or reciprocating and it is acted upon by a negative air pressure which consists essentially of a negative pressure above the bed which is modified by the reciprocation of a piston or the like.

By utilizing a combination of different means almost any desired form, periodicity and magnitude of oscillation in the air or other gaseous fluid may be obtained, the limits preferably being on the one hand a condition of continuous negative pressure of air above the bed, which may be obtained by withdrawing air from the chamber by means of a suction fan or the like and so adjusting the piston or the like as to give it zero travel in the vertical direction, and on the other hand by isolating from the chamber the suction fan or the like operating the piston or the like with the maximum travel available.

By adjusting the travel of the piston or the like in relation to the vertical height between its mean point of travel and the upper surface of the bed of material to be stratified, the character of pulsation of air or wave form may be modified. For example, if the relationship between elapsed time and air pressure within the chamber be plotted it may be found for one condition to resemble a sine curve extending entirely on the negative side of a horizontal ordinate representing zero travel. By modifying the relationship between displacement of the piston or the like and the volume of the air chamber above the bed or the thickness of the bed, the differences between the maxima and minima of the time pressure curve may be modified as desired, whilst by a further adjustment of the negative air pressure maintained by the fan or the like the minima of the curve may lie above or below zero pressure.

In one form of the invention the piston or the like may be flexibly connected to the walls of the air chamber and actuated through a plurality of links or toggles which in turn are actuated by a rod or rods coupled to an eccentric or eccentrics of variable throw, the whole being coupled to a power unit through positively variable speed gear.

In another form of the invention a plurality of pistons may be employed so as to minimize the inertia effect which would be considerable if one very large piston were employed.

Further, in such form of the invention the air chamber above the bed may consist of a plurality of compartments and means may be provided whereby the action of each piston may be varied independently of any other, and means may also be provided whereby the negative air pressure maintained by the fan or the like in each compartment may be varied independently of each other compartment.

In another form of the invention the action of the suction fan or the like may be augmented or replaced by a plurality of valves which close on the upward stroke of the piston and open on the down stroke of the piston.

According to a method of working which may be used for the purposes of the present invention the raw material to be treated is fed through an air seal into the apparatus and is acted upon simultaneously by the air pulsations above the bed and the action of two conveyors, one moving part of the bed in one direction, and the other moving the lower part of the bed in the opposite direction.

By virtue of the utilization of the air within the bed the upper strata immediately become fluid and the larger heavy particles sinking through the bed displace the lowest stratum and lie on the pervious support.

Owing to the fact that there is less pneumatic action in the lowest stratum than in any other, these large heavy particles remain undisturbed and their interstices are filled by the more slowly stratifying small heavy particles so that a relatively compact mass of heavy particles is formed in the lowest stratum. This is progressively conveyed out of the apparatus, its speed of removal being regulated so as to prevent any light particles being carried out of the apparatus.

Among the modifications of apparatus which may be employed according to the present invention there is included the provision of a central source of negative pulsating air pressure substantially as hereinbefore described and means whereby it may be connected to the bed or plurality of beds of material to be separated.

There may also be used means whereby the reciprocating parts may be balanced by means of pendulum action or the like, the pendulum device being illustrated in Fig. 8 and designated at 63.

The desired pneumatic condition above the bed may be obtained by means of a differential piston motion wherein the rod 20 carries a roller 65 contacting with a suitably shaped cam 64 so as to cause the piston to travel more quickly in an upward than in a downward direction.

Any of the means described for air pulsations may be used in combination if desired.

There may be employed a stratum of comparatively heavy divided material flat in shape which is supported upon a grillage or the like having relatively large openings in relationship to the size of the smaller particles comprising the bed of materials to be separated, which is in turn supported on the upper surface of the aforesaid heavy divided flat material.

The lower strata or lower and upper strata may, if desired, be removed by means of conveying mechanism moving forwardly in a series of impulses, such impulses being preferably synchronized with the pulsations of air pressure above the bed.

There may as indicated above be provided means whereby the raw material to be treated is fed into the apparatus through an air seal, and whereby the products after separation are removed from the apparatus through other air seals.

Further there may be provided means whereby the air utilized in the stratification may be returned to the apparatus which is then operated in a closed circuit, air seals being provided for admitting the raw product and delivering the pure products after separation.

The present invention may also be employed in conjunction with screening devices in accordance with British Letters Patent No. 322,480.

It is preferred that the separating table according to this application shall be of trough form with a substantially horizontal base.

In one form the base is perforated, and immediately above this perforated base there is a conveyor chain or the like. The bed of coal in the trough is comparatively deep, that is to say with coal of medium size, normally from about ½" to 0.

Separation, or rather removal of the separated material, is effected in part by the conveyor referred to above and in part by another conveyor which is disposed substantially on the top surface of the coal bed. This top conveyor acts to introduce the material to be separated into the trough, and to remove the separated clean coal from the trough.

Having now described my invention, what I claim as new and desire to secure by Letters Patent is:—

1. Apparatus for the separation of admixed substantially dry materials comprising a separating table including an air pervious surface for carrying the bed of material to be separated, an air chest arranged above the separating table, means connected with the air chest for maintaining a continuous negative pressure therein, and a piston vertically reciprocable in the air chest for superimposing pulsations on said negative pressure, said piston having an area substantially equal to the area of the bed of material, the height of the wall between the piston and the bed of material to be separated being relatively small in comparison with the area of the separating table covered by the air chest, and a conveyor for removing the lower stratum arranged adjacent the air pervious surface.

2. Apparatus for the separation of admixed substantially dry materials comprising a separating table including an air pervious surface for carrying the bed of material to be separated, an air chest arranged above the separating table, means connected with the air chest for maintaining a continuous negative pressure therein, and a piston vertically reciprocable in the air chest for superimposing pulsations on said negative pressure, said piston having an area substantially equal to the area of the bed of material, the height of the wall between the piston and the bed of material to be separated being relatively small in comparison with the area of the separating table covered by the air chest, a conveyor situated within the bed of material to be stratified and adjacent the top thereof for feeding the material to be separated into the region of treatment for removing the top treated layer.

IVOR LLOYD BRAMWELL.